Jan. 10, 1928.

W. H. CLAY 1,655,454

TRAILER

Filed Nov. 22, 1926    2 Sheets-Sheet 1

William Henry Clay
Inventor

By William L. Symons
Attorney

Jan. 10, 1928.
W. H. CLAY
1,655,454
TRAILER
Filed Nov. 22, 1926
2 Sheets-Sheet 2
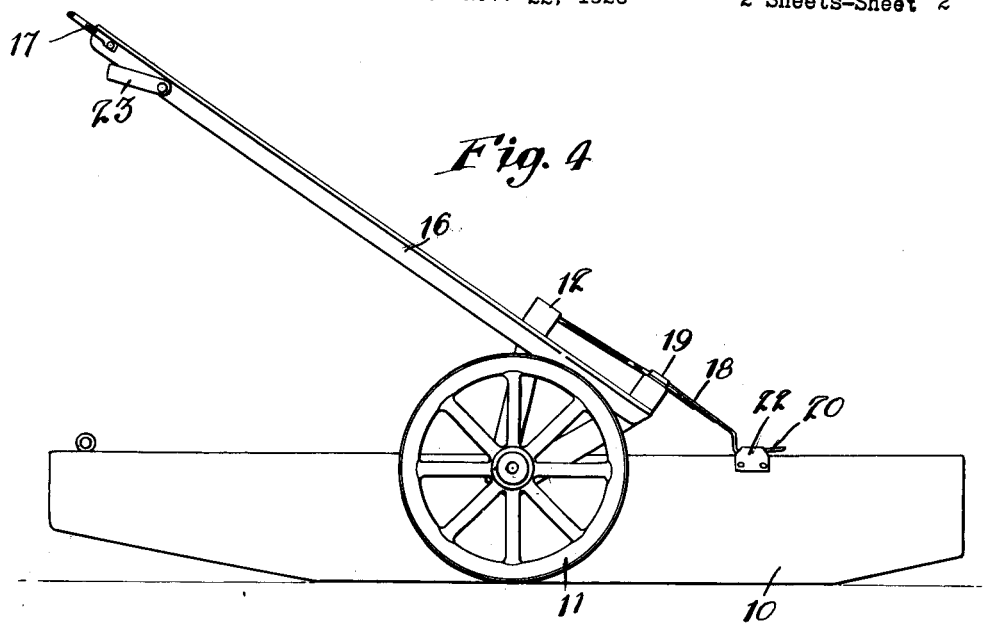
Fig. 4
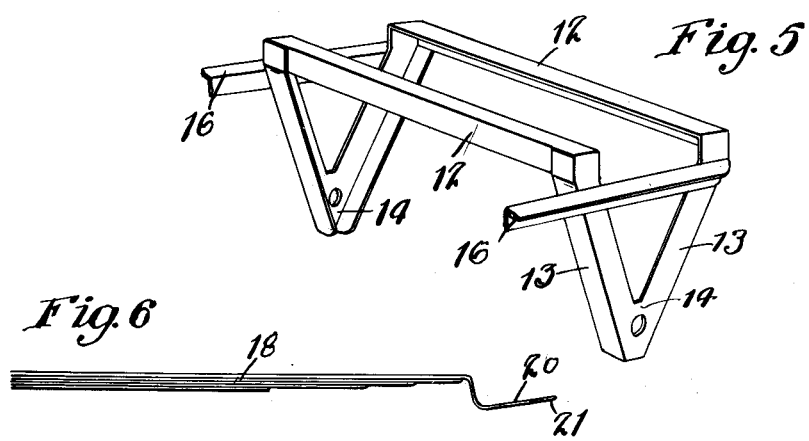
Fig. 5
Fig. 6
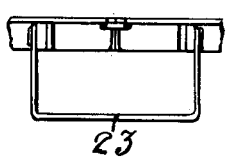
Fig. 7
William Henry Clay.
Inventor
By William L. Symons
Attorney Patented Jan. 10, 1928.

1,655,454

UNITED STATES PATENT OFFICE.

WILLIAM HENRY CLAY, OF EUSTIS, FLORIDA, ASSIGNOR OF ONE-HALF TO A. L. JOHNSON, OF EUSTIS, FLORIDA.

TRAILER.

Application filed November 22, 1926. Serial No. 149,934.

My invention relates to improvements in devices known as trailers, and more especially to a trailing device adapted to transport boats overland.

An important object of my invention is the provision of a device of the above mentioned character which may be readily attached to a boat to transport the same.

A further object of my invention is to provide a device of this character which may be easily operated by a single person.

Other objects and advantages of my invention will be apparent during the course of the following description.

Figure 1:
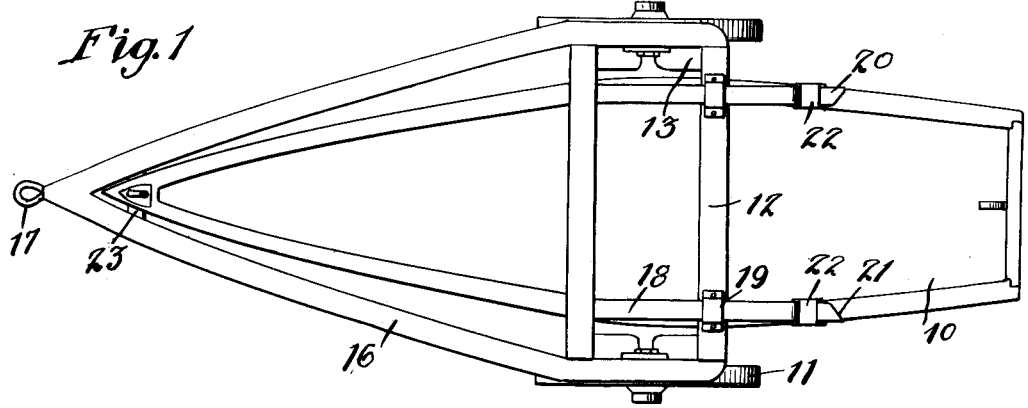
Figure 2:
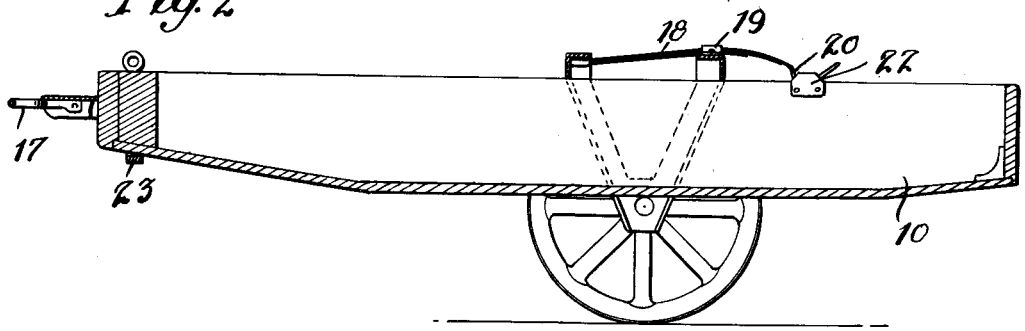
Figure 3:
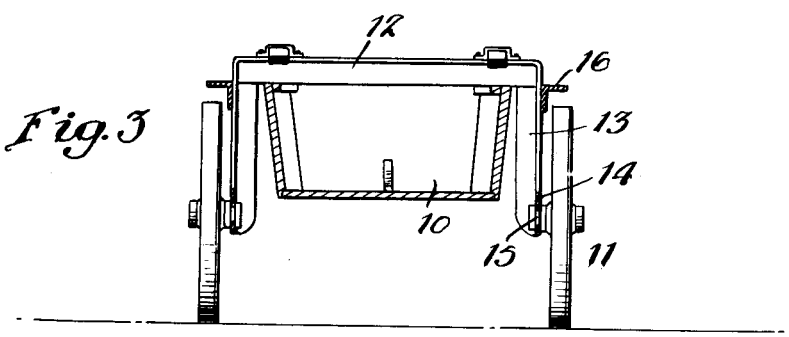

In the accompanying drawings which form a part of this specification and wherein like characters of reference denote like or corresponding parts throughout the same, Figure 1 is a plan view of the trailer in operation, Figure 2 is a central longitudinal section thereof, Figure 3 is a transverse section therethrough, Figure 4 is a side elevation showing the device with the boat in lowered position, Figure 5 is a detail perspective of a portion of the trailer frame, Figure 6 is a side elevation of one of the spring supports, and Figure 7 is a front elevation of the forward portion of the trailer showing the forward support.

In the drawings wherein for the purpose of illustration is shown a preferred embodiment of my invention the numeral 10 designates a boat which is adapted to be arranged between the wheels 11 of the trailer which are mounted upon the frame thereof. The frame comprises spaced horizontal transverse bars 12 of angle iron which are bent to form downwardly converging side arms 13 which are joined together at their lower ends as at 14 to provide supports for stub axle shafts 15, upon which the wheels 11 are rotatably mounted.

Horizontal, longitudinally arranged angle bars 16 are secured to the arms 13 adjacent their upper ends and converge to a point forwardly and centrally of the bars 12 where they are joined together. A suitable ring or eyelet 17 is secured to the front end of the bars 16 for the reception of a rope, cable or the like.

A pair of spaced leaf springs 18 are secured to the under side of the forward bar 12 and extend rearwardly over the rearward bar 12 and therebeyond. Guides 19 are secured to the rearward bar 12, and the springs 18 pass through these guides. The top leaf of each spring is bent at its end to form a downwardly offset hook portion 20 having its end beveled as at 21 to facilitate its insertion into loops formed by straps 22 attached to the sides of the boat adjacent the rearward end of the boat. The spring comprises several leaves of varying length which terminate short of the hooked portion 20 on the top leaf of each spring.

A U-shaped member or bail 23 is pivotally secured to the arms 16 adjacent their juncture and extends therebeneath. In operation the boat is held at its rearward end by the hooked ends of the springs 18 and is supported at its forward end by the U-shaped bail 23.

When it is desired to transport a boat overland, the trailer is pushed over the boat until it straddles the same, and is then tilted until hooks 20 can be inserted into the loops 22 on the boat, as illustrated in Figure 4. The front end of the trailer is then lowered, thereby raising the rear end of the boat, until the front end of the boat rests between the arms 16. The U-shaped support 23 is then swung beneath the boat and the boat is suspended by the trailer and may be carried about at will. In unloading the boat, the operation is reversed. The U-shaped support is pivoted so as to be moved from under the boat and the rear end of the boat is let down into the water by raising the front end of the trailer as shown in Figure 4. The trailer can then be drawn forward and the boat will be released therefrom by the forward movement of the hooks 20 from the loops 22.

It will be seen that the device may be readily and easily operated by a single person without undue exertion and without the need of any great amount of strength.

While I have shown and described the preferred embodiment of my invention, it is to be understood that various changes in the size, shape and arrangement of parts may be resorted to without departing from the spirit of my invention or the scope of the subjoined claims.

Having thus described my invention what I claim and desire to protect by Letters Patent is:

1. In a device of the character described, a carrier, draft means for transporting said carrier overland, including a frame comprising diverging vertical arms and spaced horizontal arms, a longitudinal bar secured to said frame and forming draft means therefor, hook ended members secured to the horizontal arms and adapted to engage loops on said carrier, and means on the forward end of the longitudinal bar for engaging the forward end of the carrier, said forwardly engaging means being manually operated and said rearward engaging means being operated to lower the carrier and to disengage the same upon tilting of the longitudinal bar and drawing it forward.

2. In a device of the character described, a carrier, draft means for transporting said carrier overland, including a frame comprising diverging vertical arms and spaced horizontal arms, longitudinal bars secured to said vertical arms and conforming to the general outline of the carrier, to form draft means therefor, leaf springs secured to said horizontal arms and extending rearwardly thereof, said springs having hook members formed on the ends thereof, and adapted to engage loops on the carrier, and a support pivotally secured to the forward ends of the longitudinal bars and adapted to be swung beneath the carrier to support the same.

3. In a device of the character described, a carrier, a trailer for transporting said carrier overland including a frame adapted to straddle said carrier, a leaf spring secured to said frame and having a hook on one end adapted to engage a loop on the carrier, and a tongue member secured to said frame and having a pivoted support adapted to engage the lower wall of the carrier to support said carrier.

4. A trailer for transporting a boat comprising a wheeled frame adapted to straddle a boat, a spring having one end secured to the wheeled frame, the other end of the spring terminating in a hook like portion adapted for removable engagement with one end of the boat, and means on the trailer to support the other end of the boat.

5. A trailer for transporting a boat comprising a wheeled frame adapted to straddle a boat, said frame having spaced transverse members adapted to be arranged over a boat, a spring secured at one end to the forward transverse member and fulcrumed intermediate of its ends on the rearward transverse member and extending rearwardly thereof, means on the rearward end of the spring for detachable connection with a boat, and means on the trailer to removably support the other end of the boat.

In testimony whereof I affix my signature.

WILLIAM HENRY CLAY.